United States Patent
Noble

(10) Patent No.: US 8,947,351 B1
(45) Date of Patent: Feb. 3, 2015

(54) POINT OF VIEW DETERMINATIONS FOR FINGER TRACKING

(75) Inventor: Isaac S. Noble, Soquel, CA (US)

(73) Assignee: Amazon Technologies, Inc., Reno, NV (US)

(*) Notice: Subject to any disclaimer, the term of this patent is extended or adjusted under 35 U.S.C. 154(b) by 433 days.

(21) Appl. No.: 13/246,561

(22) Filed: Sep. 27, 2011

(51) Int. Cl.
*G09G 5/00* (2006.01)

(52) U.S. Cl.
USPC .......................................... 345/156

(58) Field of Classification Search
None
See application file for complete search history.

(56) References Cited

U.S. PATENT DOCUMENTS

| | | |
|---|---|---|
| 4,836,670 A | 6/1989 | Hutchinson |
| 5,563,988 A | 10/1996 | Maes et al. |
| 5,616,078 A | 4/1997 | Oh |
| 5,850,211 A | 12/1998 | Tognazzini |
| 6,272,231 B1 | 8/2001 | Maurer et al. |
| 6,385,331 B2 | 5/2002 | Harakawa et al. |
| 6,434,255 B1 | 8/2002 | Harakawa |
| 6,750,848 B1 | 6/2004 | Pryor |
| 6,863,609 B2 | 3/2005 | Okuda et al. |
| 6,959,102 B2 | 10/2005 | Peck |
| 7,092,554 B2 | 8/2006 | Chen |
| 7,199,767 B2 | 4/2007 | Spero |
| 7,301,526 B2 | 11/2007 | Marvit et al. |
| 7,379,566 B2 | 5/2008 | Hildreth |
| 7,401,783 B2 | 7/2008 | Pryor |
| 7,519,223 B2 | 4/2009 | Dehlin et al. |
| 7,998,135 B2 | 8/2011 | Donitzky |
| 8,004,057 B2 | 8/2013 | Tian et al. |
| 8,643,680 B2 | 2/2014 | Baldwin et al. |
| 8,644,565 B2 | 2/2014 | Du et al. |
| 8,788,977 B2 | 7/2014 | Bezos |
| 2002/0071277 A1 | 6/2002 | Starner et al. |
| 2002/0180799 A1 | 12/2002 | Peck et al. |
| 2003/0142068 A1* | 7/2003 | DeLuca et al. ................ 345/156 |
| 2004/0140956 A1 | 7/2004 | Kushler et al. |
| 2004/0174496 A1 | 9/2004 | Ji |
| 2004/0190759 A1 | 9/2004 | Caldwell |
| 2005/0133693 A1 | 6/2005 | Fouquet et al. |
| 2005/0175218 A1 | 8/2005 | Vertegaal |
| 2005/0190275 A1 | 9/2005 | Higashitsutsumi et al. |

(Continued)

FOREIGN PATENT DOCUMENTS

| | | |
|---|---|---|
| CN | 1694045 A | 11/2005 |
| GB | 244348 | 1/2008 |

(Continued)

OTHER PUBLICATIONS

Nokia N95 8GB Data Sheet, Nokia, 2007, 1 page.

(Continued)

*Primary Examiner* — Nicholas Lee
(74) *Attorney, Agent, or Firm* — Novak Druce Connolly Bove + Quigg, LLP

(57) ABSTRACT

A user can provide input to a computing device by moving a feature or object, such as a user's finger, within a field of view of at least one imaging element of the computing device. In order to ensure an accuracy of the determined input, the computing device can also attempt to determine a point of view of the user, such as by determining a relative position of the user's face or eyes. By determining a three-dimensional position of a feature and the user's point of view, a three-dimensional vector or other directional information can be determined whereby the intersection of that vector with the computing device indicates an intended location of input corresponding to the feature from the user's point of view.

30 Claims, 6 Drawing Sheets

(56) References Cited

U.S. PATENT DOCUMENTS

| | | | |
|---|---|---|---|
| 2005/0207614 | A1 | 9/2005 | Schonberg et al. |
| 2005/0248529 | A1* | 11/2005 | Endoh .......................... 345/156 |
| 2006/0038881 | A1 | 2/2006 | Starkweather et al. |
| 2006/0256133 | A1 | 11/2006 | Rosenberg |
| 2006/0257026 | A1 | 11/2006 | Shiffer |
| 2006/0269105 | A1 | 11/2006 | Langlinais |
| 2007/0008279 | A1 | 1/2007 | Benford et al. |
| 2007/0164989 | A1 | 7/2007 | Rochford et al. |
| 2007/0189582 | A1 | 8/2007 | Hamza et al. |
| 2008/0005418 | A1 | 1/2008 | Julian |
| 2008/0013826 | A1 | 1/2008 | Hillis et al. |
| 2008/0019589 | A1 | 1/2008 | Yoon |
| 2008/0040692 | A1 | 2/2008 | Sunday et al. |
| 2008/0122803 | A1* | 5/2008 | Izadi et al. ................... 345/175 |
| 2008/0136916 | A1 | 6/2008 | Wolff |
| 2008/0158096 | A1 | 7/2008 | Breed |
| 2008/0170759 | A1 | 7/2008 | Monro |
| 2008/0174570 | A1 | 7/2008 | Jobs et al. |
| 2008/0253622 | A1 | 10/2008 | Tosa |
| 2008/0266257 | A1 | 10/2008 | Chiang |
| 2008/0266530 | A1 | 10/2008 | Takahashi et al. |
| 2008/0276196 | A1 | 11/2008 | Tang |
| 2009/0018407 | A1 | 1/2009 | Jung |
| 2009/0022368 | A1 | 1/2009 | Matsuoka |
| 2009/0031240 | A1 | 1/2009 | Hildreth |
| 2009/0079813 | A1 | 3/2009 | Hildreth |
| 2009/0115966 | A1 | 5/2009 | Waldorf |
| 2009/0196460 | A1 | 8/2009 | Jakobs et al. |
| 2009/0265627 | A1 | 10/2009 | Kim et al. |
| 2009/0286572 | A1 | 11/2009 | Rhoads et al. |
| 2009/0313584 | A1 | 12/2009 | Kerr |
| 2010/0002912 | A1 | 1/2010 | Solinsky |
| 2010/0014718 | A1 | 1/2010 | Savvides et al. |
| 2010/0014720 | A1 | 1/2010 | Hoyos et al. |
| 2010/0066676 | A1* | 3/2010 | Kramer et al. ................ 345/158 |
| 2010/0097332 | A1* | 4/2010 | Arthur et al. .................. 345/173 |
| 2010/0125816 | A1 | 5/2010 | Bezos |
| 2010/0178903 | A1 | 7/2010 | Tofighbakhsh et al. |
| 2011/0006978 | A1 | 1/2011 | Yuan |
| 2011/0102588 | A1 | 5/2011 | Trundle et al. |
| 2011/0128223 | A1 | 6/2011 | Lashina et al. |
| 2011/0143811 | A1 | 6/2011 | Rodriguez |
| 2011/0221793 | A1 | 9/2011 | King |
| 2012/0019721 | A1 | 1/2012 | Choi et al. |
| 2012/0075168 | A1 | 3/2012 | Osterhout |
| 2012/0086629 | A1* | 4/2012 | Thorn .......................... 345/156 |
| 2012/0194432 | A1 | 8/2012 | DeLuca |
| 2012/0206333 | A1* | 8/2012 | Kim .............................. 345/156 |
| 2012/0268424 | A1 | 10/2012 | Kim |
| 2013/0293530 | A1 | 11/2013 | Perez et al. |

FOREIGN PATENT DOCUMENTS

| | | |
|---|---|---|
| JP | 2002-164990 | 6/2002 |
| JP | 2002-351603 | 12/2002 |
| JP | 2004-318826 | 11/2004 |
| JP | 2007-121489 | 5/2007 |
| JP | 2008-97220 | 4/2008 |
| KR | 10-1312227 | 9/2013 |
| WO | 02/015560 A3 | 2/2002 |
| WO | 2006/036069 A1 | 4/2006 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 23, 2013", U.S. Appl. No. 12/786,297, 15 pages.

"Final Office Action dated Oct. 27, 2011", U.S. Appl. No. 12/332,049, 66 pages.

"Final Office Action dated Oct. 4, 2013", U.S. Appl. No. 13/170,164, 32 pages.

"Final Office Action dated Jun. 3, 2013", U.S. Appl. No. 13/083,303, 17 pages.

"Final Office Action dated Jun. 6, 2013", U.S. Appl. No. 12/332,049, 70 pages.

"First Office Action dated Mar. 22, 2013", China Application 200980146841.0, 39 pages.

"International Preliminary Examination Report on Patentability dated Oct. 17, 2013", International Application PCT/US2012/032148, 5 pages.

"International Search Report dated Apr. 7, 2010", International Application PCT/US09/65364, 2 pages.

"International Search Report dated Jul. 26, 2012", International Application PCT/US2012/032148, 7 pages.

"International Written Opinion dated Apr. 7, 2010", International Application PCT/US09/65364, 7 pages.

"Introducing the Wii MotionPlus, Nintendo's Upcoming Accessory for the Revolutionary Wii Remote at Nintendo:: What's New", Nintendo Games, http://www.nintendo.com/whatsnew/detail/eM-MuRj_N6vntHPDycCJAKWhE09zBvyPH, Jul. 14, 2008, 2 pages.

"Non Final Office Action dated Nov. 7, 2012", U.S. Appl. No. 12/332,049, 64 pages.

"Non Final Office Action dated Dec. 21, 2012", Korea Application 10-2011-7013875, 4 pages.

"Non Final Office Action dated Dec. 6, 2012", U.S. Appl. No. 13/083,303, 16 pages.

"Non Final Office Action dated Mar. 27, 2013", U.S. Appl. No. 13/170,164, 28 pages.

"Non Final Office Action dated Mar. 28, 2013", U.S. Appl. No. 12/786,297, 15 pages.

"Non Final Office Action dated Apr. 2, 2013", Japan Application 2011-537661, 2 pages.

"Non Final Office Action dated Jun. 10, 2011", U.S. Appl. No. 12/332,049, 48 pages.

"Office Action dated May 13, 2013", Canada Application 2,743,914, 2 pages.

Brashear, Helene et al., "Using Multiple Sensors for Mobile Sign Language Recognition", International Symposium on Wearable Computers, 2003, 8 pages.

Cornell, Jay , "Does This Headline Know You're Reading It?", h+ Magazine, located at <http://hplusmagazine.com/articles/ai/does-headline-know-you%E2%80%99re-reading-it>, last accessed on Jun. 7, 2010, Mar. 19, 2010, 4 pages.

Haro, Antonio et al., "Mobile Camera-Based Adaptive Viewing", MUM '05 Proceedings of the 4th International Conference on Mobile and Ubiquitous Mulitmedia., 2005, 6 pages.

Padilla, Raymond , "Eye Toy (PS2)", <http://www.archive.gamespy.com/hardware/august03/eyetoyps2/index.shtml, Aug. 16, 2003, 2 pages.

Schneider, Jason , "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter , "Control an iPod with Gestures", http://www.videsignline.com/howto/170702555, Sep. 11, 2005, 4 pages.

Van Den Berg, Thomas T. , "Near Infrared Light Absorption in the Human Eye Media", Vision Res., vol. 37, No. 2, 1997, pp. 249-253.

Zyga, Lisa , "Hacking the Wii Remote for Physics Class", PHYSorg.com, http://www.physorg.com/news104502773.html, Jul. 24, 2007, 2 pages.

Cappelletta, Luca et al., "Phoneme-To_viseme Mapping for Visual Speech Recognition", Department of Electronic and Electrical Engineering, Trinity College Dublin, Ireland, 2012, 8 pages.

"Non Final Office Action dated May 28, 2014", U.S. Appl. No. 13/485,195, 10 pages.

"Non Final Office Action dated Apr. 7, 2014", U.S. Appl. No. 13/332,128, 30 pages.

"Non Final Office Action dated Jun. 10, 2014", U.S. Appl. No. 13/170,167, 32 pages.

"Notice of Allowance dated Mar. 4, 2014", U.S. Appl. No. 12/332,049, 10 pages.

"Examiner's Report dated Mar. 21, 2014", Canada Application 2,743,914, 3 pages.

(56) References Cited

OTHER PUBLICATIONS

"Second Office Action dated Dec. 6, 2013", China Application 200980146841,0, 16 pages.
"Third Office Action dated May 20, 2014", China Application 200980146841.0,15 pages.
"Extended Search Report dated Jul. 23, 2014" European Application 09828299.9, 16 pages.
"Supplemental Search Report dated Aug. 5, 2014" European Application 09828299.9, 3 pages.
"Final Office Action dated Feb. 4, 2014", Japan Application 2011-537661, 2 pages.
"Notice of Allowance dated Jul. 8, 2014", U.S. Appl. No. 12/786,297, 6 pages.
"Notice of Allowance dated Aug. 14, 2013", U.S. Appl. No. 13/083,303, 6 pages.
"Non Final Office Action dated Jun. 10, 2011", U.S. Appl. No. 12/332,049, 47 pages.

* cited by examiner

POINT OF VIEW DETERMINATIONS FOR FINGER TRACKING

BACKGROUND

People are increasingly interacting with computers and other electronic devices in new and interesting ways. One such interaction approach involves making a detectable motion with respect to a device. While complex motion analysis devices are able to determine such motion with relative accuracy, this analysis is difficult to implement on consumer devices, particularly mobile or portable computing devices that generally have relatively simple camera elements. These camera elements often suffer from various limitations that make it difficult to determine relative position and motion from still or video image information. Such limitations also make it difficult to properly interpret motions of a user at a distance from a device for purposes of device input.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, various embodiments enable a user to provide position, motion, and/or gesture-based input to an electronic device without need to physically contact the device. In at least some embodiments, two or more digital still cameras, video cameras, infrared sensors, or other such image capture elements of an electronic device can be used to determine the relative position of at least one feature of a user, such as a user's fingertip or an object being held by a user, with respect to the device. The determined relative position of that feature can be used to provide input to the electronic device, such as to select an option displayed on a display element of the device, move a virtual or graphical cursor across a display of the device, or provide another such input. In many instances, the input which a user intends to provide using that feature depends not only on the relative position of the finger with respect to the device, but also the relative position of the user's eyes with respect to the device. From a user's perspective, the feature is "over" an area of the device with respect to that user's eyes or point of view, and not necessarily directly over that feature from a perspective of the device. Thus, approaches in accordance with various embodiments also attempt to determine a relative gaze position or point of view of the user to attempt to determine a location with respect to the device where the user intends to provide input using the identified feature. These determinations can be made using the same or different image capture elements as are used for the feature position determinations.

Figure 1:
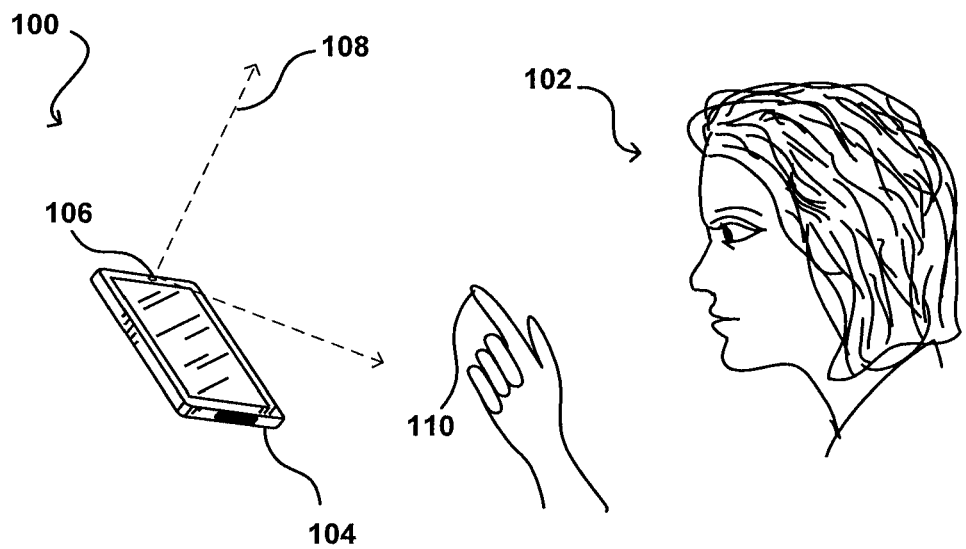
FIG. 1 illustrates an example environment in which various aspects can be implemented in accordance with various embodiments.

For example, FIG. 1 illustrates an example situation 100 wherein a user 102 is attempting to provide input to a computing device 104 by positioning the user's fingertip 110 in a particular location with respect to the computing device. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another appropriate image capturing technology.

In this example, the user 102 is performing a selected motion or gesture using the user's hand 110. The gesture can be one of a set of motions or gestures recognized by the device to correspond to a particular input or action, might be used to control the position of a virtual cursor on the device along a path that follows a path of the user's hand, or can be a specific motion or gesture associated with that particular user. In some embodiments the motion might be a motion to a specific position where the user's hand rests or dwells for a period of time, indicating a positional input to be provided to the device. Various other inputs and determinations can be utilized as well. If the motion is performed within a field of view or angular range 108 of at least one of the imaging elements 106 on the device, the device can capture image information including at least a portion of the user's hand (i.e., at least a fingertip if such feature is used to provide input), analyze the image information using at least one image analysis, feature recognition, or other such algorithm, and determine position and/or movement of at least one feature of the user for one or more frames or portions of the image information. This can be performed using any process known or used for recognizing and object and determining motion, such as by locating "unique" features in one or more initial images and then tracking the locations of those features in subsequent images, whereby the movement of those features can be tracked and/or compared against a set of movements corresponding to the motions or gestures, etc. In some embodiments, a display screen of the computing device can be a capacitive display allowing for non-contact input by a user when a feature of the user (e.g., a fingertip) is within a detectable range (e.g., 3-5 cm.) of the display. Various approaches for determining position-, motion-, and/or gesture-based input can be found, for example, in co-pending U.S. patent application Ser. No.

12/332,049, filed Dec. 10, 2008, and entitled "Movement Recognition and Input Mechanism," which is hereby incorporated herein by reference.

Figure 2:
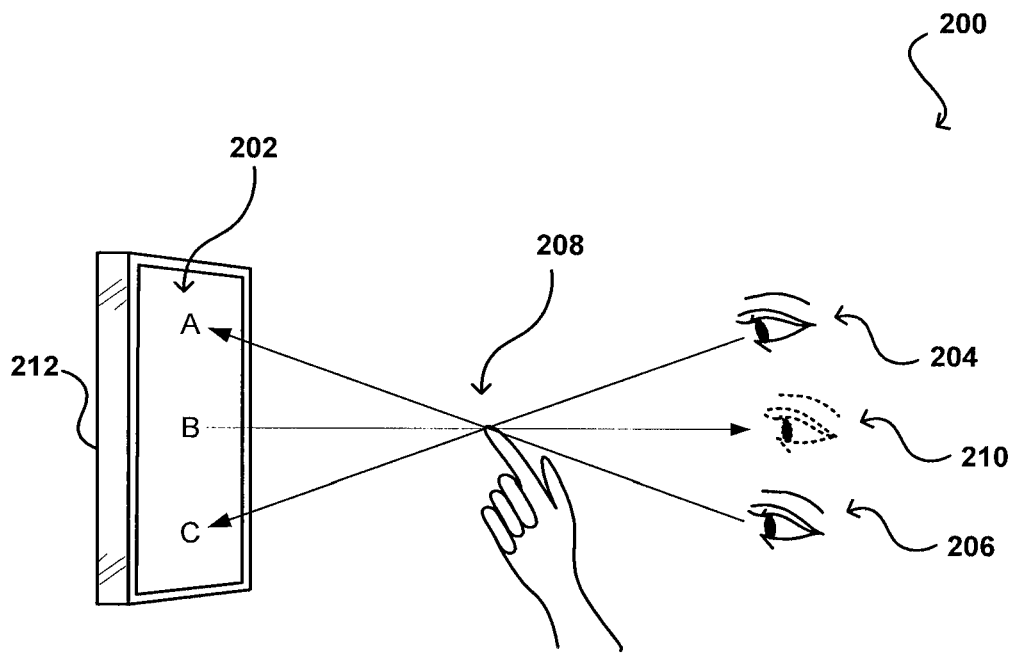
FIG. 2 illustrates example problems with finger tracking that can be addressed by various embodiments.

As discussed above, however, it can be difficult to accurately determine input from the tracked feature because the feature alone may not provide enough information for the input. For example, FIG. 2 illustrates an example situation 200 wherein a user intends to use a fingertip 208 to provide input to a computing device 212 by controlling a position of that fingertip relative to information 202 displayed on the computing device. As illustrated, the position of the finger with respect to the intended input can be relative to the perspective of the user. For example, if the user's eyes are at the top illustrated position 204, the user's fingertip position is "over" the letter C towards the bottom of the display (at least from the perspective of the user). If, on the other hand, the user's eyes are at the bottom illustrated position 206, the user's fingertip position is "over" the letter A towards the top of the display (again, at least from the perspective of the user). Further complicating the issue is the fact that, without user perspective information, the computing device 212 might interpret the relative fingertip position to be directly "over" certain other displayed information (i.e., position would be determined using a vector between the finger tip and the device that is orthogonal to a primary plane of the display). For example, without user perspective information the computing device 212 might determine that the fingertip is attempting to indicate the letter B near the middle of the display element, which would correspond to a central viewing position 210 of the user. This will often not be the case, particularly in cases such as that illustrated in FIG. 1 where the computing device is tilted at an angle and/or laterally offset from a viewing position of the user.

It also should be understood that errors in the intended position information are not a two-dimensional problem, as might be the impression from the illustration of FIG. 2, but can be a three-dimensional problem in many instances. For example, the user might not be directly in front of the computing device, or might have the device at least slightly tilted or rotated right or left with respect to the user. Thus, the determination might not only be offset in an up-down direction, but also in a right-left direction. It therefore can be desirable to determine a direction of a three-dimensional vector passing between the user's eyes and the fingertip or other feature to provide input, and determine where that vector intersects the device (or a virtual plane associated with the device—such as may "extend" from a display screen of other element or face of the device) in order to ensure the proper input or "hover" position where the user intends the feature to be hovering "over" or otherwise with respect to the device.

Figure 3:
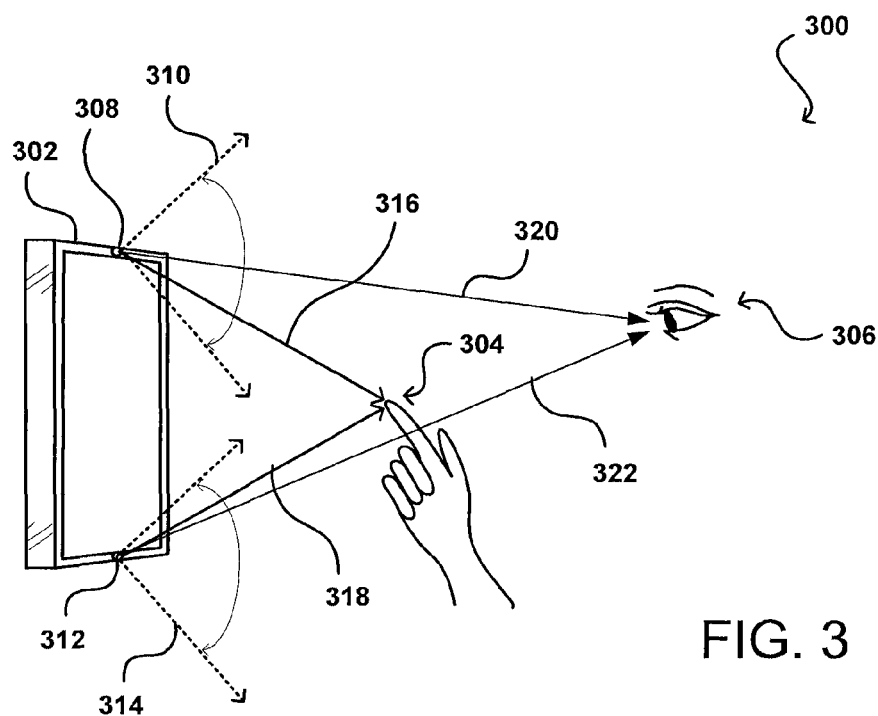
FIG. 3 illustrates an example finger and gaze-based approach that can be used to provide input to an electronic device in accordance with various embodiments.

Accordingly, FIG. 3 illustrates an example approach 300 that can be used to determine an intended input position corresponding to at least one feature of the user in accordance with various embodiments. In this example, a user is again intending to provide input to an electronic device 302 by controlling a position of the user's fingertip 304 with respect to the device, with the position being based at least in part by a viewing position 306 or point of view of the user. As discussed later herein, the point of view can be determined using positions of the user's eyes, pupils, head, or other such features that can be indicative of at least a general point of view. The illustrated electronic device 302 in this example, however, has at least two different image capture elements 308, 312 positioned on the device with a sufficient separation such that the device can utilize stereoscopic imaging (or anther such approach) to determine a relative position of one or more features, with respect to the device, in three dimensions.

Although two cameras are illustrated near a top and bottom of the device in this example, it should be understood that there can be additional imaging elements of the same or a different type at various other locations on the device as well within the scope of the various embodiments. Further, it should be understood that terms such as "top" and "upper" are used for clarity of explanation and are not intended to require specific orientations unless otherwise stated. In this example, the upper camera 308 is able to see both the fingertip and at least one eye 306 of the user as long as those features are within a field of view 310 of the upper camera 308 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 316 of the fingertip with respect to the upper camera. Similarly, the software can determine an approximate direction 320 to at least one eye of 306 of the user. Merely knowing the direction to these features will not be sufficient in at least some embodiments, however, as the distance to these features can affect the vector between them, and thus the intended input location on the device. For example, if the eye 306 in FIG. 3 was twice as far away from the device, the point at which a vector between the eye and the fingertip would hit the device 302 would be at a different location (higher, in the figure) than for the current distance.

Accordingly, it can be desirable in at least some embodiments to further determine the distance to one or more of these features. In some embodiments, methods such as ultrasonic detection, feature size analysis, luminance analysis through active illumination, or other such distance measurement approaches can be used to assist with position determination. In this example, however, a second camera is used to enable distance determinations through stereoscopic imaging. In this example, the lower camera 312 is also able to image the fingertip 304 and at least one eye 306 as long as those features are at least partially within the field of view 314 of the lower camera 312. Using a similar process to that described above, appropriate software can analyze the image information captured by the lower camera to determine an approximate direction 318 to the user's fingertip and an approximate direction 322 to the at least one eye position. The directions can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a 45 degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

Figures 4A, 4B:
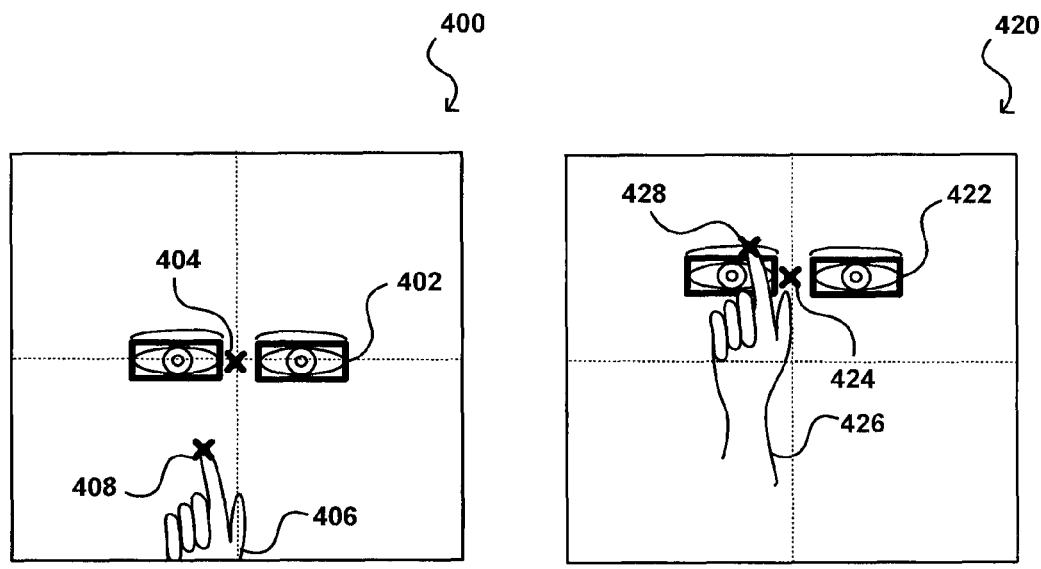
FIGS. 4(a) and (b) illustrate example images for analysis in accordance with various embodiments.

Further illustrating such an example approach, FIGS. 4(a) and 4(b) illustrate example images 400, 420 that could be captured of the fingertip and user's eyes using the cameras 308, 312 of FIG. 3. In this example, FIG. 4(a) illustrates an example image 400 that could be captured using the upper camera 308 in FIG. 3. One or more image analysis algorithms can be used to analyze the image to perform pattern recognition, shape recognition, or another such process to identify a feature of interest, such as the user's fingertip. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 406, at least one point of interest 408, here the tip of the user's index finger, is determined. As discussed above, the software can use the location of this point with information about the camera to determine a relative direction to the fingertip. Similarly, the one or more analysis algorithms can locate the position(s) 402 of one or more eyes of the user in the image. In addition to the algorithms discussed above, other approaches for locating an iris or pupil of a user, such as by monitoring infrared reflection, can be utilized as well within the scope of the various embodiments. Examples of such approaches can be found, for example, in co-pending U.S. patent application Ser. No. 12/332,049, entitled "Movement Recognition as Input Mechanism," filed Dec. 10, 2008, which is hereby incorporated herein by reference.

As illustrated in this example, both eyes of the user might be able to be located in the captured image information. Depending on factors such as the desired level of sensitivity and distance between the user and the device, however, such information can impact the accuracy of the input position determinations. For example, a vector from the user's right eye through the fingertip might intersect the device at a substantially different location than a vector from the user's left eye, which can result in erroneous position determinations. Approaches in accordance with various embodiments can take advantage of the fact that the human brain combines and processes information from both eyes such that the user views the fingertip with from a "single" point of view. Thus, the software can attempt to determine an intermediate point 424 between the user's eyes to use as the user's point of view. Various other approaches can be used as well, such as are discussed later herein.

Once the point of view 404 of the user is determined, a direction to the user's point of view as well as to the fingertip can be determined from the upper camera. A similar approach can be used with the image 420 captured by the lower camera as illustrated in FIG. 4(*b*), where the hand 426 and eyes 422 of the user are located and directions to corresponding points 428, 424 determined. As illustrated in FIGS. 4(*a*) and 4(*b*), there can be offsets in the relative positions of the features due at least in part to the separation of the cameras. Further, there can be offsets due to the physical locations in three dimensions of the features of interest. By looking for the intersection of the direction vectors to determine the positions of the fingertip and point of view in three dimensions, and then determining a "gaze" or "hover" direction or vector through those positions to interest with the screen, an intended input direction can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

Figure 5:
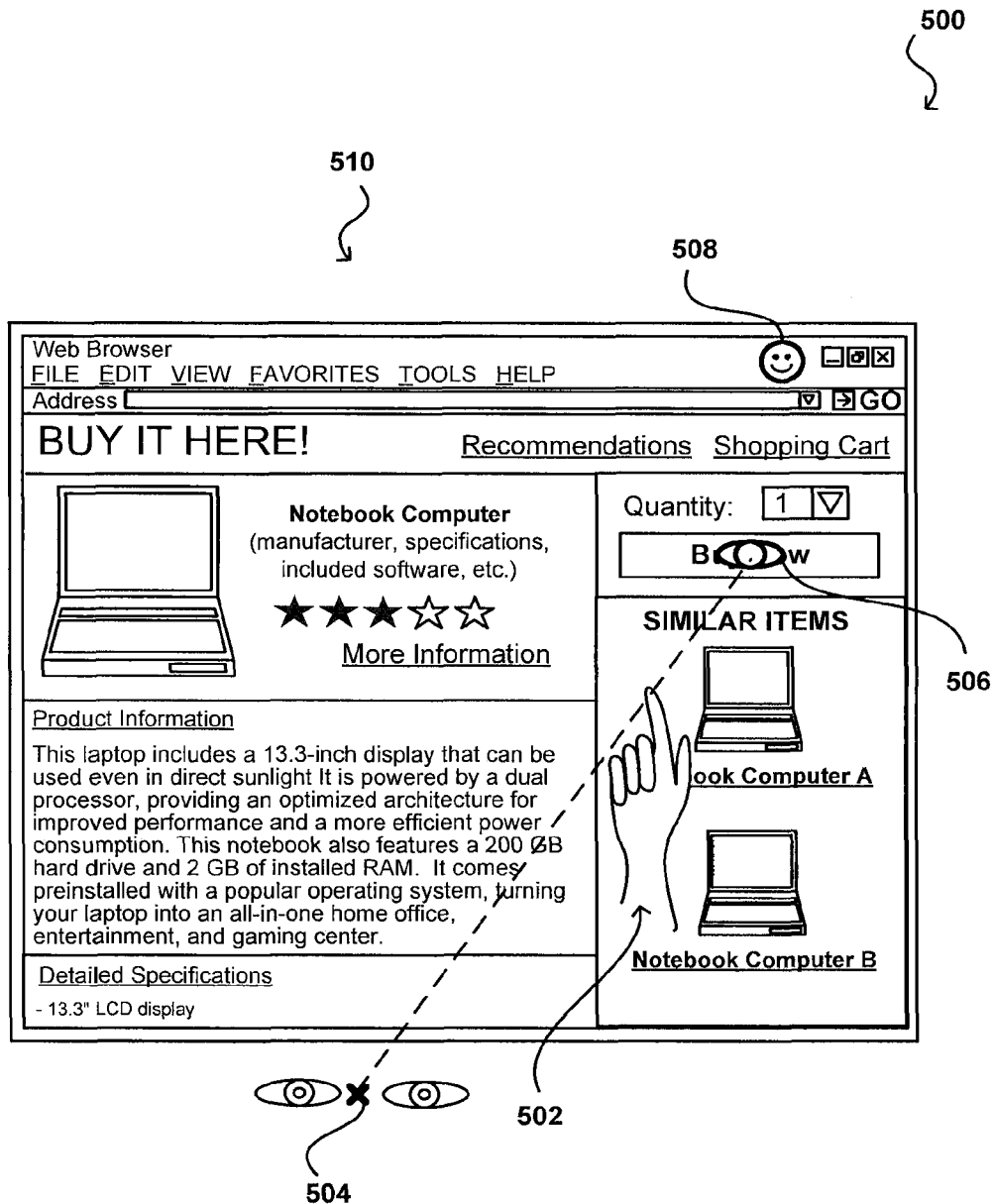
FIG. 5 illustrates an example interface display that can take advantage of finger tracking in accordance with various embodiments.

FIG. 5 illustrates an example situation 500 wherein a user is attempting to control a virtual cursor on a computing device using the position of the user's fingertip. The user can position the user's hand 502 between the user's eyes and an interface 510 displayed on the computing device to provide position input to the device. As mentioned, a point of view 504 corresponding to the user's eyes can be determined, as well as a position of the user's fingertip (or other feature being used to provide input), and a vector can be calculated to determine the location on the interface where the user is intending to provide input. In this example, a graphical element 506 can be placed at the determined location to help ensure the user that the proper location has been determined. Using such an approach, the user can adjust the finger position to correct for small errors and/or can determine when a recalibration might be necessary. In some embodiments, a user detected to make a small adjustment in position can be used to adjust calibration information automatically. The graphical element 506 can be any appropriate element, and can be visible continuously or periodically, or upon movement of the input feature. In other embodiments, the element 506 might be at least partially transparent such that the user can still view content "behind" or "under" the element on the display. In this example, at least one indicia 508 can be provided to the user to indicate that finger tracking is active.

In addition to tracking position, approaches in accordance with the various embodiments can also monitor motions or gestures of one or more user features at the tracked position. For example, in FIG. 5 the user's input location is above a "Buy Now" button of the interface. In some embodiments the user can select that element by "hovering" the user's finger over that position for a minimum period of time that can cause the device to register a "select" action, causing the button to be selected. In other embodiments, however, the user might be able to perform a specific motion or gesture to perform such as selection. For example, the user might be able to perform a "tapping" motion of the fingertip in the air, bend the user's finger, or perform another such motion. In addition to the relative position determinations, one or more gesture recognition algorithms can be used to recognize gestures performed at those positions for purposes of input. Examples of gesture detection algorithms and approaches can be found, for example, in co-pending U.S. patent application Ser. No. 13/170,164, entitled "Camera-Based Sensor for Motion Detection," filed Jun. 27, 2011, which is hereby incorporated herein by reference. Other actions can be provided as well, such as to magnify a portion of an interface "under" which the finger is hovering, etc. Similarly, a user might use distance changes to perform certain actions. For example, a user might move a finger position laterally to indicate a particular location on the interface, and then might move the finger "forward" to select an item which then can be moved to another location and "dropped" by moving the finger backward, or away from the device. Similarly, if a user is in a drawing application then different distances might correspond to different colors, or no color at all, such that the user can make complex illustrations based only on finger motion away from the device in some embodiments. Distance also can be used for various other purposes, such as to control a zoom level of an image or type on a virtual keyboard, where the lateral position of a finger indicates the key and the longitudinal distance represents which key(s) is being pressed. Swipe typing and other such functionality can be implemented as well as should be apparent in light of the present disclosure.

Figure 6:
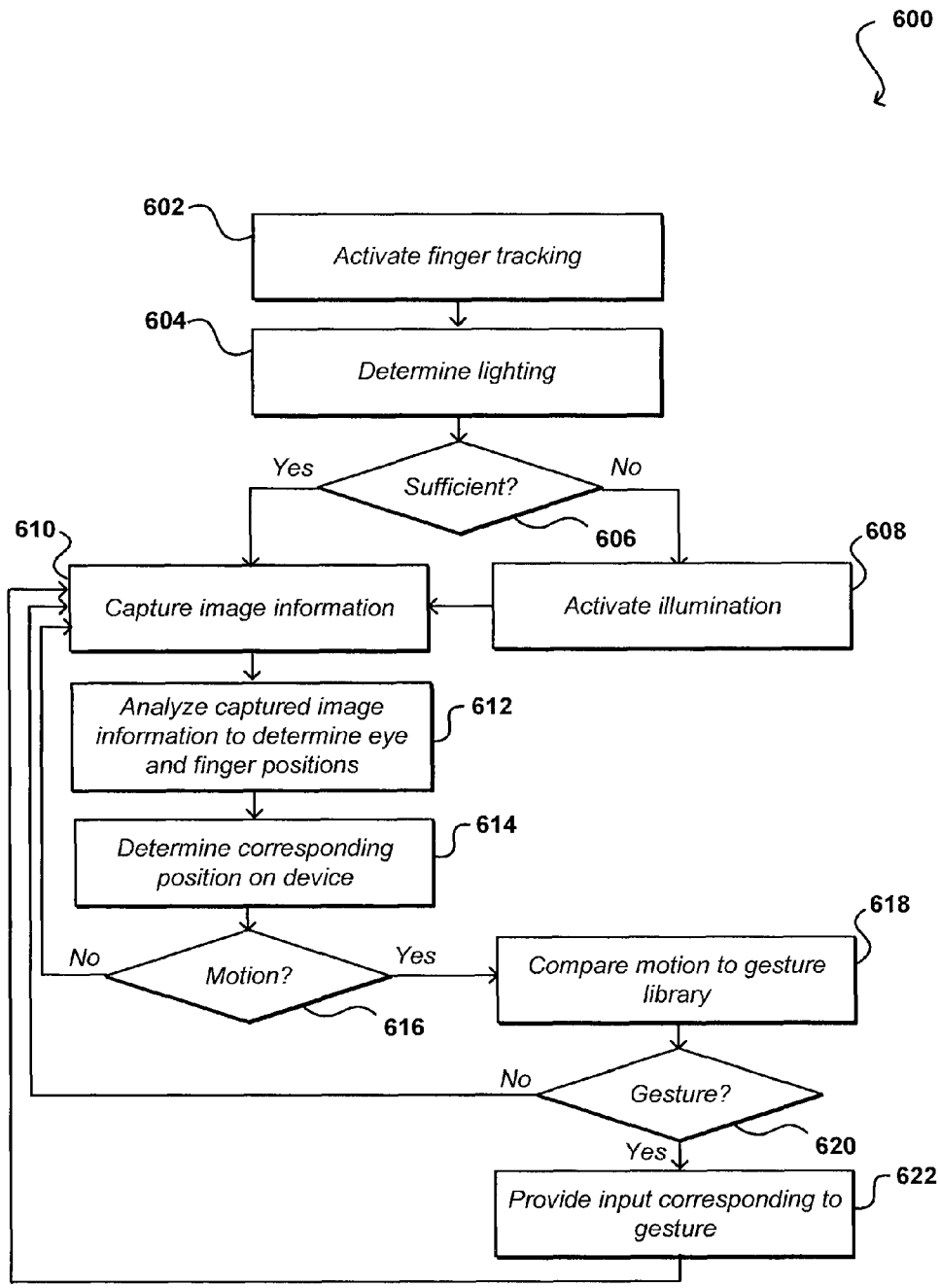
FIG. 6 illustrates an example process for determining user input that can be performed in accordance with various embodiments.

FIG. 6 illustrates an example process 600 for determining user input via feature tracking that can be used in accordance with various embodiments. It should be understood that, for any process discussed herein, there can be additional, fewer, or alternative steps performed in similar or alternative orders, or in parallel, within the scope of the various embodiments unless otherwise stated. In this example, finger tracking is activated on a computing device 602. It should be understood, however, that other features such as specific objects held by a user, can be tracked as well within the scope of the various embodiments. Further, certain embodiments allow for concurrent input from two or more features, such as multiple fingers or objects held in each hand, etc. In at least some embodiments the tracking is activated manually by the user or upon activation of an application, for example, but can also be continually active in at least a low power state in other embodiments. In some embodiments, a computing device might run in a low power or low resolution mode, such as where there has not been recent input from feature tracking. Such a mode can comprise, for example, capturing image information at a lower capture rate or analyzing captured information less frequently. In at least some embodiments, the device will change into a different mode or otherwise activate certain functionality once motion is detected, whether through image analysis, use of a motion detector, etc.

In this example, a light sensor or other such mechanism (e.g., hardware and/or software analyzing captured image information) can determine whether there is sufficient lighting 606 for feature tracking. If it is determined that the light is not sufficient 606, or if light is otherwise needed (such as for IR illumination), one or more illumination sources can be activated 608 for the capturing of image information 610. As mentioned elsewhere herein, an illumination source can be any appropriate source operable to provide an adequate amount and/or type of illumination (e.g., white light or IR), at any appropriate time (e.g., continuously during image capture or strobed with a timing of the capture).

The captured image information, which can include cached or other such temporarily stored image information as discussed elsewhere herein, can be analyzed to attempt to determine a relative position of the user's fingertip (or other input feature) as well as the user's eye position or point of view 612. As discussed, this can include position information determined from two or more instances of image information as analyzed by one or more algorithms for recognizing the features and determining directions to, or relative positions of those features. Once the relative positions of the input feature and the user's point of view are determined, a corresponding position on the device can be determined 614, such as by determining a point of intersection of a vector (e.g., viewing direction) between the point of view and the input feature. The determined input location then can be provided to at least one other process on the device to determine user input.

As discussed, in some embodiments a user can guide a virtual cursor through movement of the input feature, and select an element by "hovering" that feature over the desired element for a minimum period of time to indicate a selection action. In other embodiments, a motion or gesture might be used to indicate a selection action. In this example, a determination is made 616 as to whether a motion of the input feature occurs at the determined position. As discussed, this can include monitoring image information over time to track changes in a position and/or shape of the feature. If motion of the input feature is detected, the motion can be compared to a gesture library 618, as may be stored in memory on the device, to determine whether the motion corresponds to a known gesture. Any appropriate matching algorithm can be used as discussed or suggested herein, or as is known or used in the art for attempting to match point sets, functions, paths, or other such features. If the motion is determined to match a gesture 620 with at least a minimum level of confidence or other such measure, input corresponding to that gesture can be provided to the device 622. Examples of methods for determining gestures and providing input are discussed in co-pending application Ser. No. 13/170,164, which is incorporated by reference above. Various other approaches can be used as well as discussed or suggested elsewhere herein.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the hand from various other objects in an image, and would have to identify the hand as a hand, regardless of the hand's orientation. Such an approach can require shape or contour matching, for example, which can still be relatively processor intensive. A less processor intensive approach can involve separating the hand from the background before analysis.

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time. A further benefit is that the human eye is a retro-reflector and the pupils will show as bright spots in the reflected IR, such that the eyes can also potentially be easily separated from the background in at least some embodiments.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

It also should be understood that, in addition to information such as zoom level and field of view, it can also be important in at least some embodiments for the software to know the relative position of the cameras or other image capture elements on the device. For example, image information can be analyzed to determine directions or position vectors to features, but those determinations are relative to a center point (or other position) of the camera capturing that image information. In order to properly combine the vectors from different images to determine an intersection point, the separation between the cameras capturing those images should also be taken into account in at least some embodiments. Various approaches for three-dimensional mapping or modeling using stereoscopic imaging or other such approaches based at least in part upon camera separation can be used as known or used in the art. Other approaches such as active capacitive, passive capacitive, and ultrasonic approaches can be used for finger detection, and processes such as ambient or IR imaging, at one or more wavelengths, can be used for eye detection, among other such processes.

To further improve accuracy, approaches in accordance with various embodiments can also account for the fact that humans typically have a dominant eye, such that the point of view for a given user typically will not be a center point between that user's eyes. For example, a person who is right eye dominant will have a point of view that is closer to that user's right eye. Further, right eye dominant users often have less offset than left eye dominant people. In some embodiments, an initial calibration procedure can be used to attempt to determine a user's point of view. In other embodiments, a center point of the user's eyes can be used as an initial approximation, and then small adjustments made by the user over time can be monitored to attempt to adjust the center point determination, such as where the user frequently drifts his or her finger slightly to the left to select the correct element. In at least some situations, this information can be stored and/or updated for each user, such that the accuracy can be improved even when multiple users utilize a single device. Various other calibration adjustments can be done in real time as well, as may be due to other variations between specific users.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Various other processes can be used to improve the accuracy of finger tracking processes as well. For example, in at least some situations glasses can make eye or pupil detection more challenging, as there can be glare or a filtering effect from the lenses. Further, depending upon the thickness or curvature of the lenses there can be some optical displacement of the apparent eye position, which can affect the vector determination for certain users. In such cases, there might be different calibration information depending on whether the user is wearing the glasses, or an initial or more detailed calibration process might be needed to compensate for the glasses. Other compensation or adjustment methods can be used as well as known for optical measurements and other such purposes.

Figure 7:
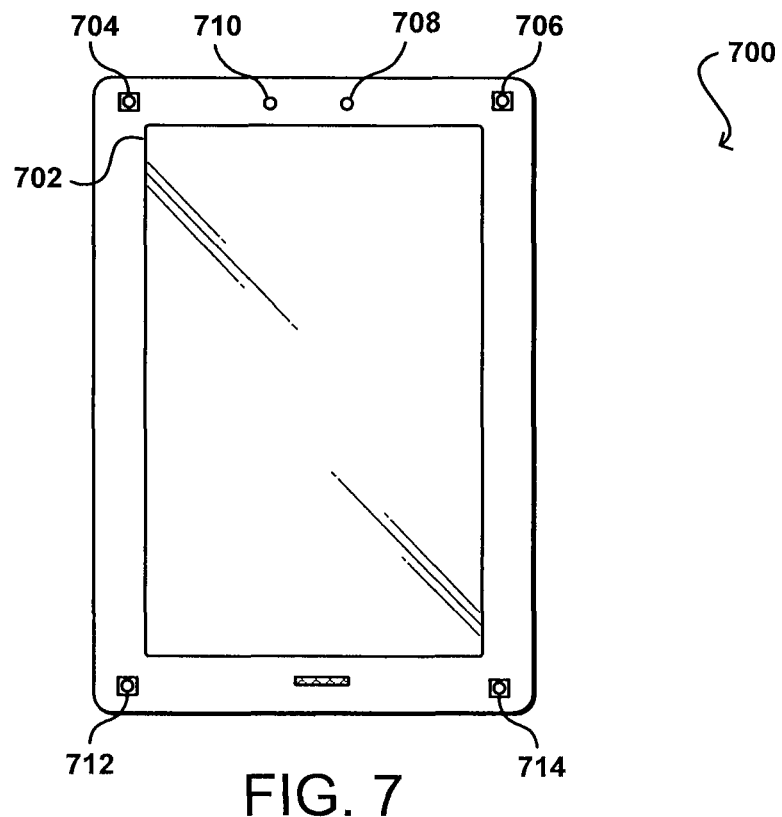
FIG. 7 illustrates an example computing device that can be used in accordance with various embodiments.

FIG. 7 illustrates an example computing device 700 that can be used to perform methods in accordance with various embodiments discussed and suggested herein. In this example, the device has four image capture elements 704, 706, 712, 714 positioned at various locations on the same side of the device as a display element 702, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 708 is included that can be used to determine an amount of light in a general direction of objects to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

In some embodiments, the two cameras near the bottom might be operated in an IR mode and used for finger tracking, since the user's finger can obstruct a view of the user's eyes. The two cameras near the top might be operated in an ambient light mode to perform face or eye tracking, using image recognition or similar processes. Such separation can assist with feature detection as it can be difficult to separate the plane of the user's face from the plane of the user's hand if using all ambient light image information, for example. Another advantage is that the face typically will not move as quickly in the images, such that the face tracking cameras can operate at a lower frame rate, which conserves power and also can be more appropriate for what can be more processor-intensive face tracking processes.

Figure 8:
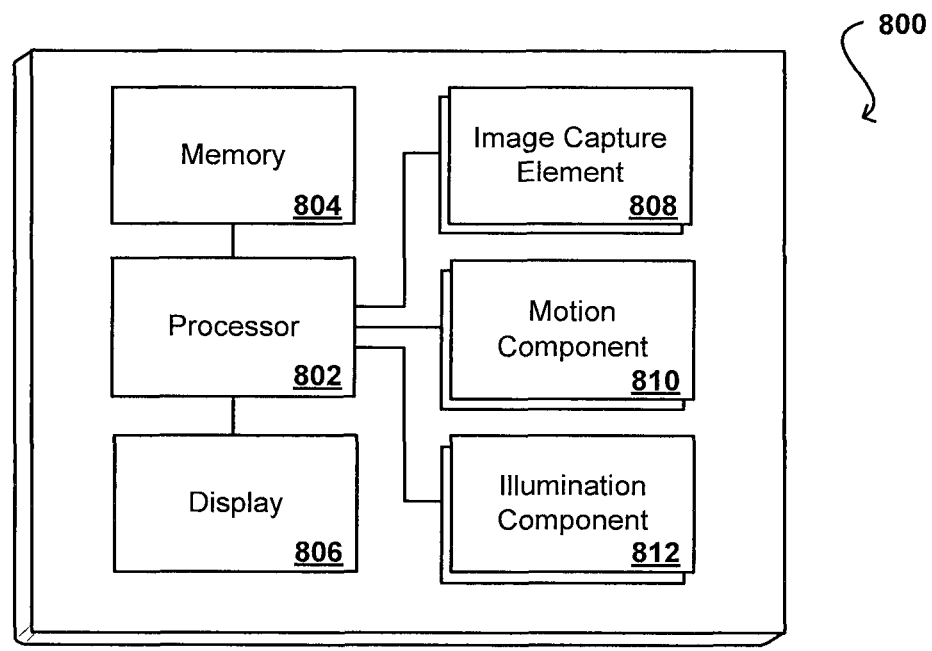
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 810, such as an electronic gyroscope used to determine motion of the device for assistance in input determination. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
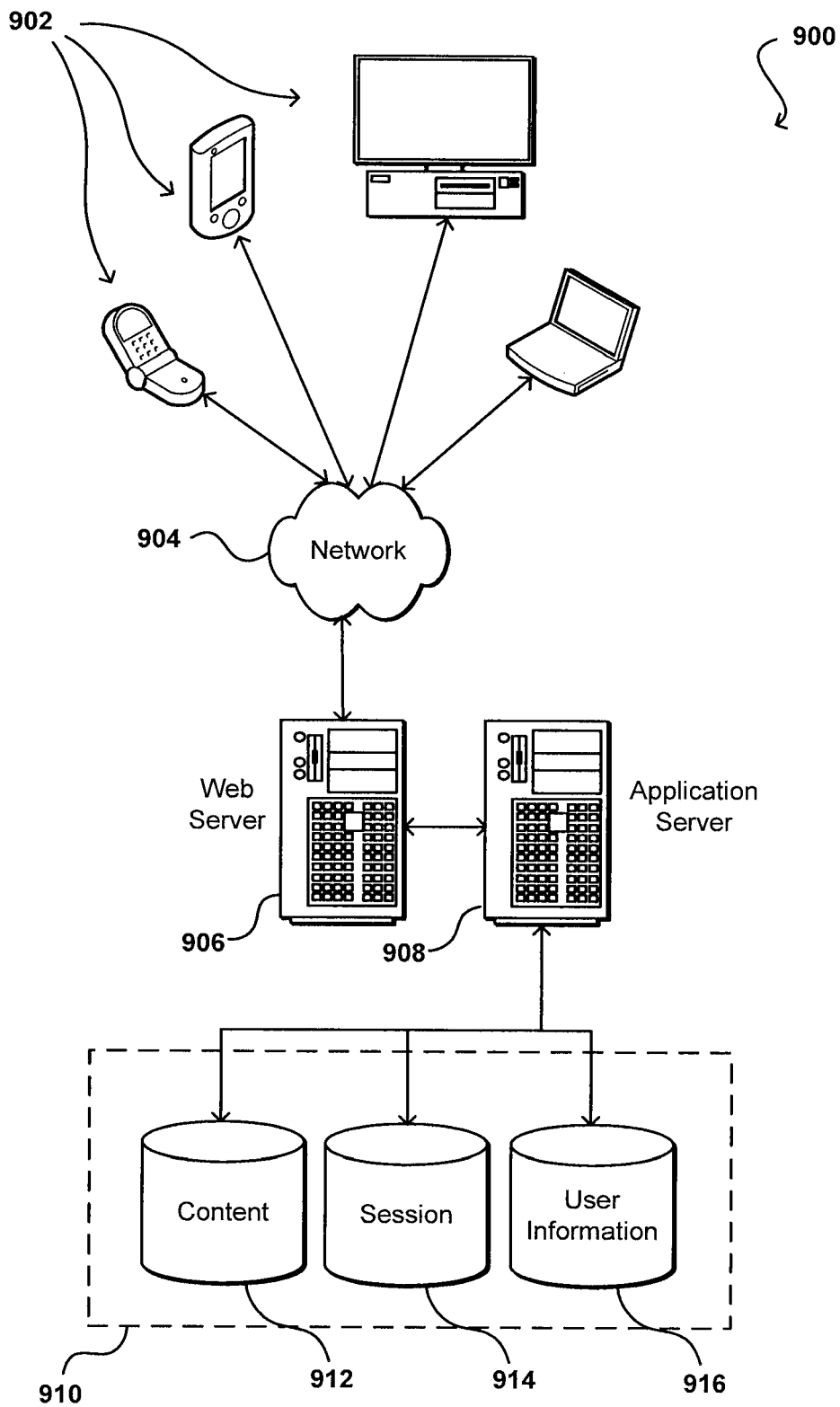
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of determining input for a computing device, comprising:
    capturing a first image using a first camera of the computing device and a second image using a second camera of the computing device, the first and second cameras having overlapping fields of view;
    analyzing, using at least one processor of the computing device, the first image to determine a first relative position of a fingertip of a user and a first relative position corresponding to eyes of the user;
    analyzing, using the at least one processor of the computing device, the second image to determine a second relative position of the fingertip and a second relative position corresponding to the eyes;
    based at least in part upon the first relative position of the fingertip, the second relative position of the fingertip, the first relative position corresponding to the eyes, and the second relative position corresponding to the eyes, determining a three-dimensional fingertip position and a position corresponding to the eyes in three-dimensional space;
    calculating, using the at least one processor of the computing device, a vector passing through the three-dimensional fingertip position and the position corresponding to the eyes in three-dimensional space; and
    determining, using the at least one processor of the computing device, an input location based at least in part upon the vector and a tilt of the computing device with respect to the user.

2. The computer-implemented method of claim 1, wherein movement of the fingertip with respect to the computing device is capable of controlling a desired input location with respect to an interface of the computing device from a perspective of the user of the computing device.

3. The computer-implemented method of claim 1, wherein determining the three-dimensional fingertip position includes:
    determining a first feature vector corresponding to the first relative position of the fingertip;

determining a second feature vector corresponding to the second relative position of the fingertip; and performing vector manipulation to determine the three-dimensional fingertip position based at least in part upon the first feature vector and the second feature vector.

4. The computer-implemented method of claim 1, wherein determining the position corresponding to the eyes in three-dimensional space includes:

determining a first viewing vector corresponding to the first relative position corresponding to the eyes;

determining a second viewing vector corresponding to the second relative position corresponding to the eyes; and performing vector manipulation to determine the position corresponding to the eyes in three-dimensional space based at least in part upon the first viewing vector and the second viewing vector.

5. The computer-implemented method of claim 1, further comprising:

determining a respective dominance of one eye of the user; and using the respective dominance to further determine the position corresponding to the eyes in three-dimensional space.

6. The computer-implemented method of claim 1, wherein analyzing the first image to determine the first relative position of the fingertip and the first relative position corresponding to the eyes and analyzing the second image to determine the second relative position of the fingertip and the second relative position corresponding to the eyes includes:

processing the first image and the second image using at least one image recognition or pattern recognition algorithm.

7. The computer-implemented method of claim 1, further comprising:

detecting the fingertip of the user in the first image and the second image; and determining an intersection of a respective additional vector for each other detected fingertip for purposes of providing additional input to the computing device.

8. A computer-implemented method of determining input to an electronic device, comprising:

under control of one or more computing devices including executable instructions, obtaining image information captured using at least two image capture elements of the electronic device;

analyzing the image information to determine a first three-dimensional position of a determined feature of a user;

analyzing the image information to determine a second three-dimensional position corresponding to at least one eye of the user; and calculating an input location on the electronic device where the user is attempting to provide input to the electronic device, the input location corresponding to a tilt of the electronic device with respect to the user and a vector passing through the first three-dimensional position and the second three-dimensional position.

9. The computer-implemented method of claim 8, further comprising:

monitoring changes in the input location over time; and providing a selection input to the electronic device when the input location corresponds to a selectable element of an interface for at least a minimum period of time corresponding to a selection action.

10. The computer-implemented method of claim 8, further comprising:

monitoring motions of the determined feature;

comparing the motions of the determined feature to a set of input gestures; and upon one of the motions matching one of the set of input gestures, providing a corresponding input to the electronic device.

11. The computer-implemented method of claim 8, wherein the determined feature includes a portion of a body of the user or an object being held by the user.

12. The computer-implemented method of claim 8, wherein the image information includes at least one of ambient light information and reflected infrared radiation information.

13. The computer-implemented method of claim 8, further comprising:

activating at least one illumination element during obtaining the image information using at least one image capture element.

14. The computer-implemented method of claim 8, wherein the electronic device includes at least four imaging elements, a first pair of imaging elements capturing the image information in an ambient light detection mode and a second pair capturing the image information in an infrared detection mode.

15. The computer-implemented method of claim 8, wherein the first three-dimensional position and the second three-dimensional position are determined using at least one of stereoscopic image analysis, feature size analysis, luminance analysis, or distance information from at least one distance determination element.

16. The computer-implemented method of claim 8, further comprising:

deactivating of obtaining the image information when no determined feature of the user is detected within a specified period of time.

17. The computer-implemented method of claim 8, wherein the input location corresponds to at least one of magnifying a portion of an interface, adjusting a zoom level of content on the electronic device, selecting an interface element, moving the interface element, or navigating to different portions of the interface.

18. The computer-implemented method of claim 8, further comprising:

analyzing the image information to determine whether the user is wearing glasses; and adjusting the second three-dimensional position to account for variations in a determined eye position of the user resulting from the glasses.

19. The computer-implemented method of claim 8, further comprising:

monitoring adjustments made by the user with respect to the input location; and adjusting at least one calibration parameter to compensate for the adjustments.

20. The computer-implemented method of claim 8, wherein calculating the input location on the electronic device where the user is attempting to provide the input to the electronic device includes using at least one vector manipulation process to determine the vector passing through the first three-dimensional position and the second three-dimensional position.

21. The computer-implemented method of claim 8, wherein calculating the input location further includes calculating an intersection point where the vector passing through the first three-dimensional position and the second three-dimensional position intersects a plane of the electronic device, wherein the intersection point is located a distance from the electronic device.

22. A computing device, comprising:
a device processor;
at least two image capture elements; and
a memory device including instructions operable to be executed by the processor to perform a set of actions, causing the computing device to:
obtain image information captured using at least two image capture elements of the computing device;
analyze the image information to determine a first three-dimensional position of a determined feature of a user;
analyze the image information to determine a second three-dimensional position corresponding to at least one eye of the user; and
calculate an input location on the computing device where the user is attempting to provide input to the computing device, the input location corresponding to a tilt of the computing device with respect to the user and a vector passing through the first three-dimensional position and the second three-dimensional position.

23. The computing device of claim 22, wherein the instructions when executed further cause the computing device to:
monitor changes in the input location over time; and
provide a selection input to the computing device when the input location corresponds to a selectable element of an interface for at least a minimum period of time corresponding to a selection action.

24. The computing device of claim 22, further comprising:
at least one gesture sensor operable to monitor motions of the determined feature, the computing device being further caused to compare the motions of the determined feature to a set of input gestures and, upon one of the motions matching one of the set of input gestures, provide a corresponding input to the computing device.

25. The computing device of claim 22, further comprising:
at least one illumination element operable to provide illumination when the computing device is caused to obtain the image information using at least one image capture element.

26. The computing device of claim 22, wherein the computing device includes a first pair of imaging elements capturing the image information in an ambient light detection mode and a second pair capturing the image information in an infrared detection mode.

27. A non-transitory computer-readable storage medium storing instructions that, when executed by at least one processor of a computing device, cause the computing device to:
obtain image information captured using at least two image capture elements of the computing device;
analyze the image information to determine a first three-dimensional position of a determined feature of a user;
analyze the image information to determine a second three-dimensional position corresponding to at least one of the user; and
calculate an input location on the computing device where the user is attempting to provide input to the computing device, the input location corresponding to a tilt of the computing device with respect to the user and a vector passing through the first three-dimensional position and the second three-dimensional position.

28. The non-transitory computer-readable storage medium of claim 27, wherein the instructions when executed further cause the computing device to:
monitor changes in the input location over time; and
provide a selection input to the computing device when the input location corresponds to a selectable element of an interface for at least a minimum period of time corresponding to a selection action.

29. The non-transitory computer-readable storage medium of claim 27, wherein the instructions when executed further cause the computing device to:
monitor motions of the determined feature;
compare the motions of the determined feature to a set of input gestures; and
upon one of the motions matching one of the set of input gestures, provide a corresponding input to the at least one processor.

30. The non-transitory computer-readable storage medium of claim 27, wherein the instructions when executed further cause the computing device to:
capture a first portion of the image information in an ambient light detection mode using a first pair of imaging elements and a second portion of the image information in an infrared detection mode using a second pair of imaging elements.

* * * * *